C. Reuter,
Chase.
No. 98,799.
Patented Jan. 11, 1870.
2 Sheets Sheet 1.
FIG. 1.
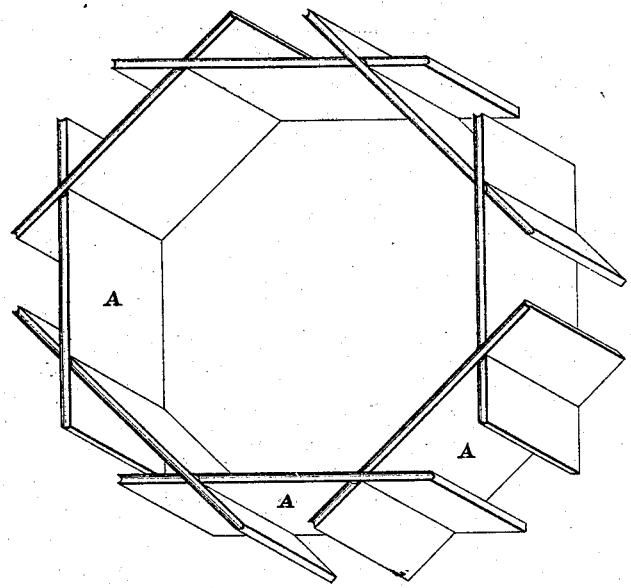
FIG. 2.
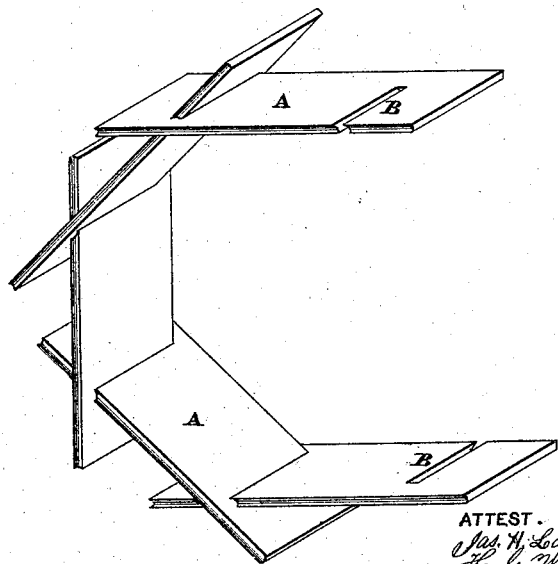
FIG. 3.
FIG. 4.
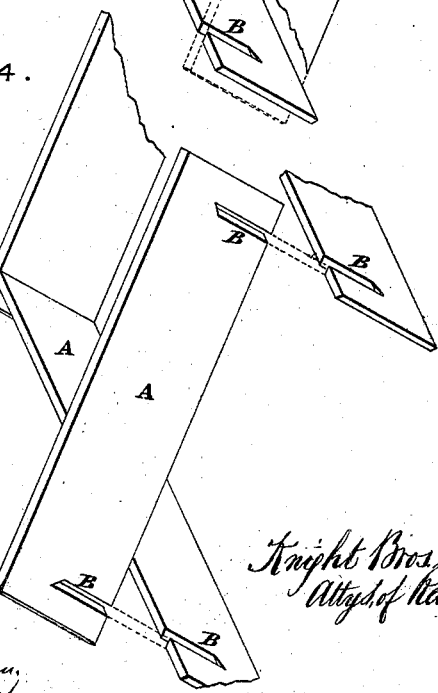

C. Reuter,
Chase.

No. 98,799.  Patented Jan. 11, 1870.

ATTEST.
Jas. H. Layman
H. G. Webber

Knight Bros.
Attys. of Reuter.

United States Patent Office.

CONRAD REUTER, OF CINCINNATI, OHIO, ASSIGNOR TO "CINCINNATI TYPE-FOUNDRY," OF SAME PLACE.

Letters Patent No. 98,799, dated January 11, 1870.

IMPROVEMENT IN PRINTERS' RULES.

The Schedule referred to in these Letters Patent and making part of the same.

I, CONRAD REUTER, of Cincinnati, Hamilton county, Ohio, have invented a new and useful Improvement in Printers' Rules, of which the following is a specification.

Nature and Objects of the Invention.

This invention has for its object a simple and effective mode of joining the brass or other "rules" employed by printers to enclose or separate type, and is especially designed for the formation of borders in the printing of labels, corners, and calendars.

General Description, with Reference to the Drawings.

Figure 1 is a perspective view of an octagonal border formed on my plan;

Figure 2 shows a portion of the members of the same detached;

Figure 3 is a perspective view of a "diamond" or rhombic border;

Figure 4 shows a portion of the same, with one member detached;

Figure 5:
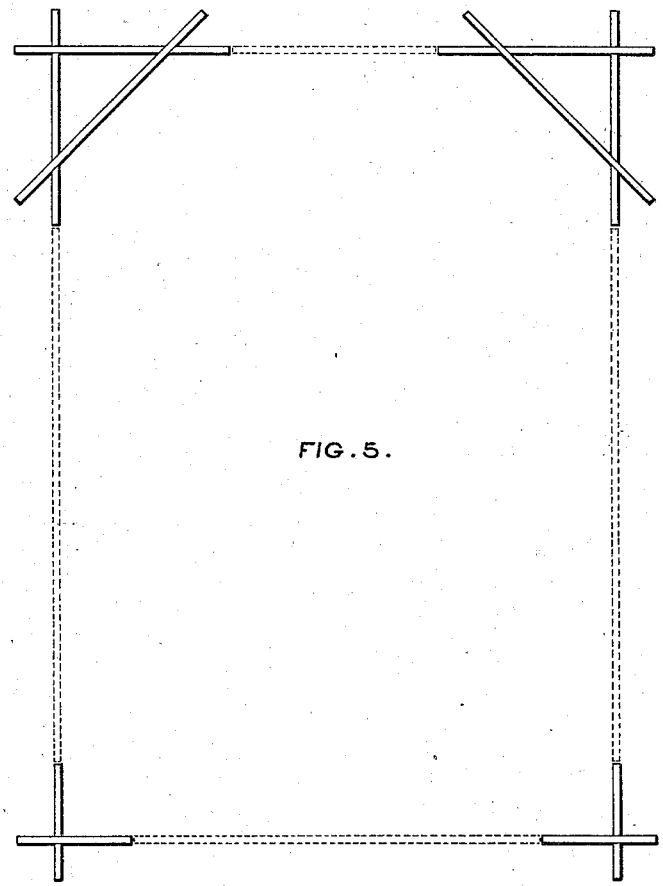
Figure 5 shows a set of corner-pieces.
Figure 6:
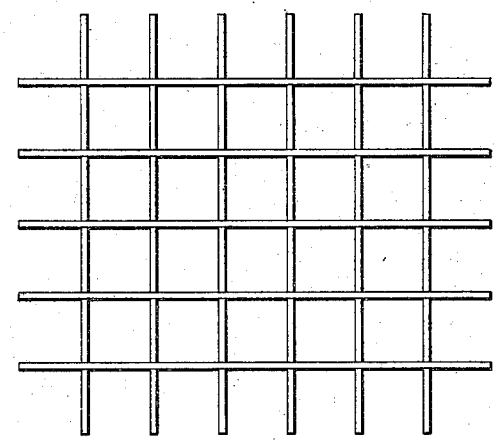

Figure 6, a series of intersecting rules, applicable for the printing of calendars and other tables.

A are strips of brass, or other suitable material, such as is employed in the composition of printers' rules.

These strips have notches, B, which, entering one of the edges, extend vertically from the same, partly across the width of the strip.

These notches pass from side to side of the stuff, at any angle that may suit the particular form of figure, as, for example, triangular, square, rhombic, hexagonal, or other.

The working-edges (faces) of the strips may have a groove, as in figs. 1 and 2, or other ornamental detail, or may be plain, as in figs. 3 and 4, and they may be straight, as in the present illustration, or of any curved or other form that taste or fancy may dictate.

Claim.

I claim, as my invention, joining printers' rules, by notching them on to one another, in the manner set forth.

In testimony of which invention, I hereunto set my hand.

CONRAD REUTER.

Witnesses:
 GEO. H. KNIGHT,
 JAMES H. LAYMAN.